United States Patent [19]

Dion et al.

[11] 3,740,736

[45] June 19, 1973

[54] SPIRAL RECORDING WITH ERROR CHECKING

[75] Inventors: C. Norman Dion, Dennis T. Maruyama, both of San Jose, Calif.

[73] Assignee: Memorex Corporation, Santa Clara, Calif.

[22] Filed: Feb. 28, 1972

[21] Appl. No.: 229,709

[52] U.S. Cl. ..... 340/174.1 G, 340/174.1 B, 346/137

[51] Int. Cl. .......................................... G11b 27/36

[58] Field of Search ............ 340/174.1 B, 174.1 G, 340/174.1 H; 179/100.2 B, 100.2 T; 346/137

[56] References Cited

UNITED STATES PATENTS

| | | | |
|---|---|---|---|
| 3,510,857 | 5/1970 | Kennedy et al. | 340/174.1 G |
| 3,535,687 | 10/1970 | Leiter | 340/174.1 G |
| 3,686,682 | 8/1972 | Behr | 340/174.1 G |

*Primary Examiner*—Vincent P. Canney
*Attorney*—Karl A. Limbach, George C. Limbach, John P. Sutton et al.

[57] ABSTRACT

A certifier for computer disc memories in which a voice coil motor drives cam loaded read-write flying heads radially across a disc restrained by a control cam so that the heads follow a single continuous spiral path over the disc. Three read-write heads examine the disc at a test location on the spiral after D.C. erasure to read for extra bits, write data and read for missing bits. Error comparisons are made against a one revolution integration of the output of the data read head. A modulation test compares the one revolution integration of data head output to a part revolution integration of the data head output.

4 Claims, 8 Drawing Figures

SPIRAL RECORDING WITH ERROR CHECKING

BACKGROUND OF INVENTION

Magnetic recording discs are used in disc packs for computer memories. A memory of this type is shown in U. S. Pat. No. 3,544,980 issued to R. A. Applequist where cam ramp loaded flying heads are moved to circular record tracks by a voice coil motor. In order to prevent data errors due to disc defects, it is customary to certify the magnetic recording discs before use. Certification is generally performed in a manner quite similar to the actual recording and reading of data by the computer memory; recording heads are positioned to an individual radial track on the disc; data is written, read back, and compared for extra and missing data bits and then the actuator is operated to reposition the heads to a new track. Heretofore certification has been an extremely time consuming process.

SUMMARY OF INVENTION

In accordance with this invention disc certification is performed in a much shorter time by operating the certification heads along a single continuous spiral path instead of discrete circular paths. The accessing time necessary to start and stop radial movement of the heads is eliminated. The pitch of the spiral path is controlled so that the width of the heads overlap on adjacent turns of the spiral thereby guaranteeing that there are no untested areas of the disc.

Use of a spiral test path instead of a circular path creates several problems, but these problems are overcome by performing the certification with three magnetic heads mounted adjacent to each other fixed with respect to each other and operating together on the spiral track. The first head reads a track which has been D.C. erased so that the head will detect as a noise pulse any interruption in the magnetic coating which could produce a missing bit of computer data. The second head writes data at maximum certification bit density, and the third head immediately reads back the track written by the second to detect missing bits. The second and third heads are mounted as close together as possible on the single actuator structure to minimize the problem of maintaining them in alignment.

The actuator employed for generating a spiral path is a rotary cam which limits radially inward movement of the head support carriage while a voice coil motor urges the carriage forward to keep a cam follower on the carriage engaged with the cam. The voice coil motor can reverse to pull the carriage and cam follower away from the cam so that the inertia of the spiral track control does not slow down retraction. An inertia free drive can also be employed for a movable D.C. erase magnet so that the heads can be retracted as rapidly as possible in case of head crash or other emergency.

In the control circuits of the certifier the decision that a defect is present is made if the anticipated output of some part of the circuit is reduced by a predetermined percentage from normal output. Now, recording head output in a magnetic disc recorder is normally proportioned to the radius of the recording head from the center of the disc. For this reason a comparison signal is generated, decreasing in amplitude as the recording heads approach the center of the disc and this comparison signal is used as the standard for all tests. The comparison signal is generated by integrating the output of the data read head, the third head mentioned above, for a predetermined period of time, preferably one turn of the spiral path so that the "standard of comparison" is the average output of the data read head during the immediately preceding revolution of the disc.

In addition to drop-outs and noise, discs are certified on this certifier for modulation, that is, magnetic head output which changes cyclically around a track usually as a function of periodic variations in coating thickness. In this certifier the modulation test is performed by integrating the output of the data read head for a period of time substantially longer than the period of data repetition but substantially shorter than the period over which the signal is integrated for generation of the comparison signal. The outputs of the two integrators are then compared to detect as modulation any major changes in the average output amplitude of the data read head during one revolution.

Any error threshold can be selected for the various tests depending upon a number of criteria. It has been found satisfactory, however, to use the following thresholds: The circuits are adjusted to recognize a noise error when the circuit output is reduced 25 percent in the circuit of the head reading the D.C. erased disc. The circuits are adjusted to recognize a drop-out when a data pulse read by the third head is reduced 40 percent in amplitude, and a modulation error is recognized when the part revolution integrator varies more than 30 percent from a standard set by the full revolution integrator. These values have been found to be satisfactory certification criteria for typical magnetic recording discs for computer data.

Normal disc production produces a small number of discs of much higher quality than the standards identified above. It is desirable to identify those special exceptional quality discs so that they may be segregated for special uses. For this reason the certifier is provided with a first set of indicators to show if a test disc passes each of the certification standards mentioned above and a second indicator to show if the disc also possesses the exceptionally high standards. The first set of indicators employ comparators with the 25 percent, 40 percent and 30 percent comparison standards and the second indicator employs a similar set of comparators but with much stricter standards.

These and other features of the invention will be apparent from the following description of one embodiment of the invention, it being understood that many modifications may be made in the details described without departing from the spirit and scope of the invention. This particular embodiment is designed for certification of the discs used in IBM type 2316 disc packs, and it has proven satisfactory for certifying such discs in a test time of 15 seconds. In the drawings.

Figure 1:
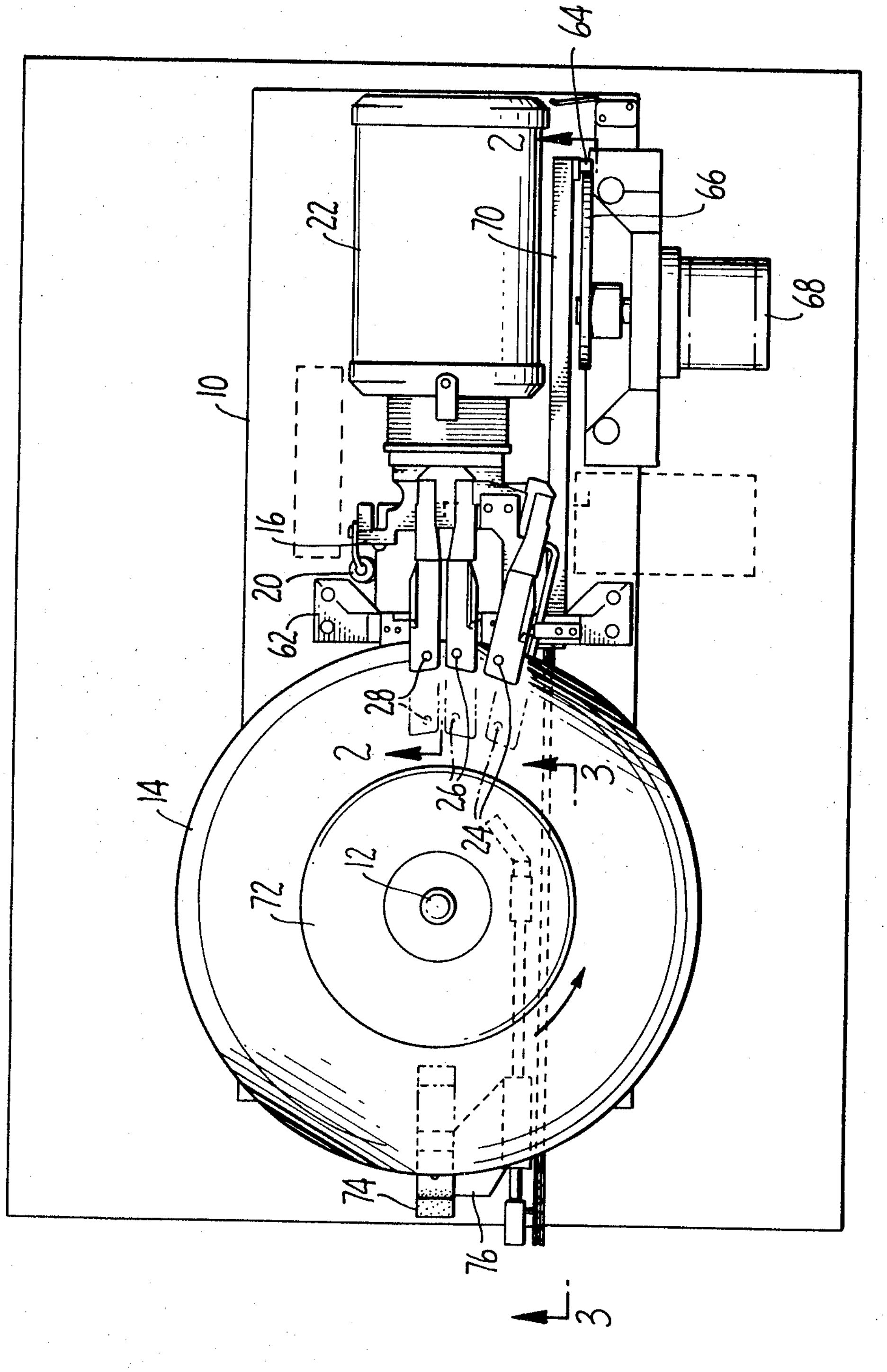
FIG. 1 is a top plan view of a magnetic recording disc certifier constructed in accordance with the principals of this invention.
Figure 2:
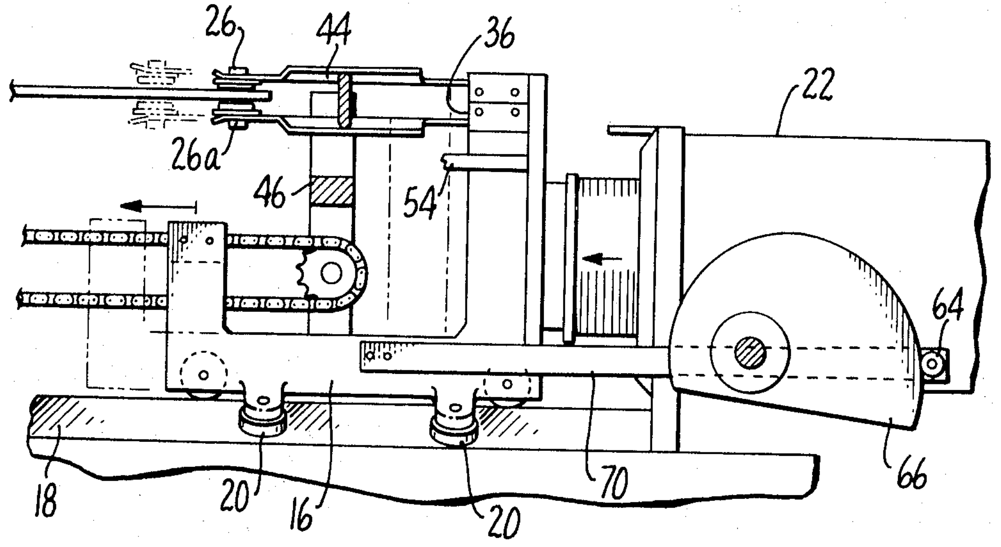
FIG. 2 is a side elevational view of the certifier of FIG. 1 taken along the bifurcated plane indicated at 2—2 in FIG. 1.
Figure 4:
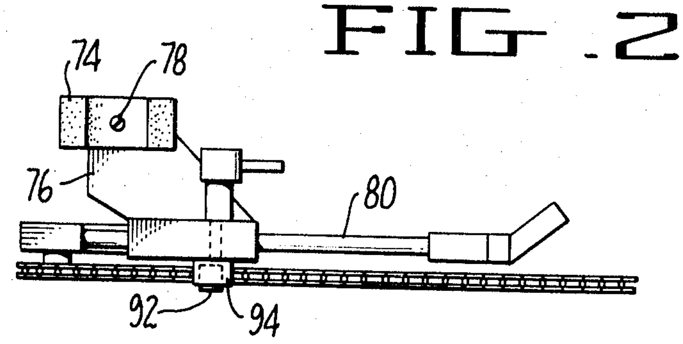
FIG. 4 is a top plan view of a portion of the apparatus illustrated in FIG. 3.
Figure 3:
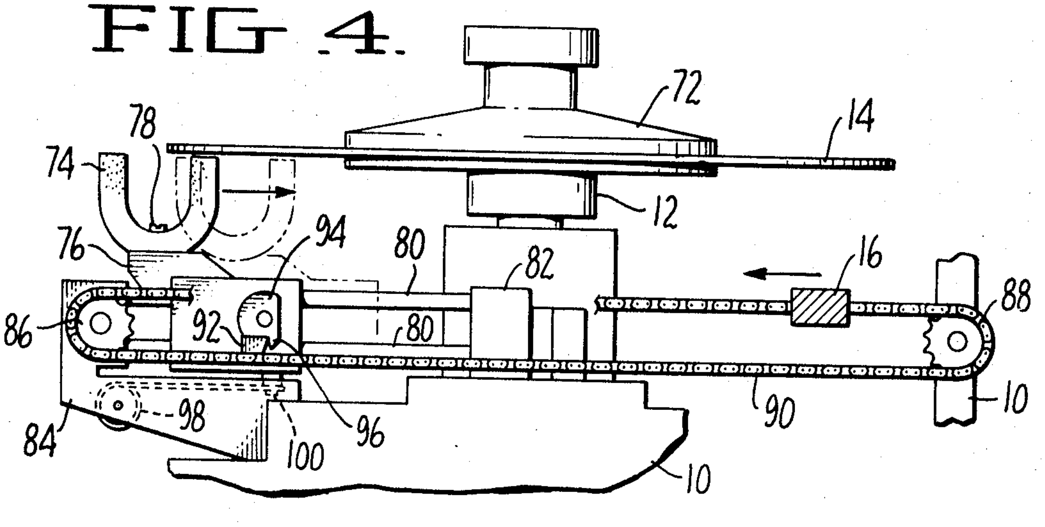
FIG. 3 is an elevational view taken on the plane indicated at 3—3 in FIG. 1.

Referring now in detail to the drawing, and particularly to FIGS. 1, 2 and 3, the apparatus includes a frame 10 carrying a spindle 12 for supporting a magnetic recording disc 14 and rotating the disc about its central axis. A carriage 16 is supported for smooth longitudinal movement on a way 18 by means of rollers 20 with the way 18 arranged generally radially of the spindle 12. A voice coil motor 22 is connected to the carriage for moving the carriage along the way, all as described in greater detail in the above identified Applequist patent.

Two sets of magnetic recording head arm assemblies are provided in the certifier, one set for operation on the top surface of the disc and the other set for operation on the bottom surface of the disc. The two sets operate in the same way and for the purpose of the following description, only the top set is described. The corresponding parts in the bottom set are designated by similar reference numbers on the drawing followed by the letter A.

Figure 5:
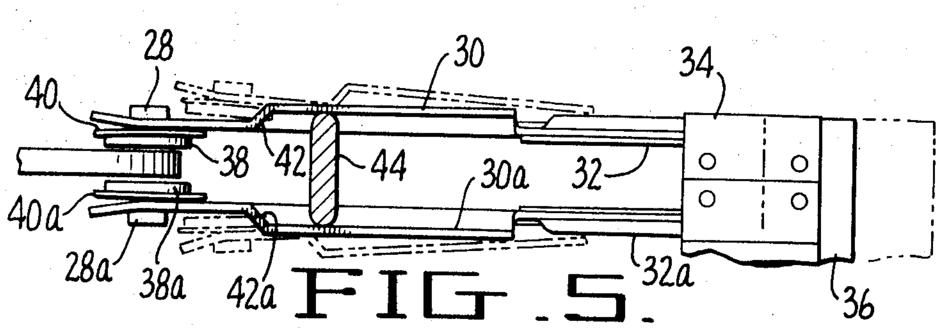
FIG. 5 is a side elevational view on a larger scale of the top portion of apparatus illustrated in FIG. 2.

The three head arms assemblies have a first head 24 for reading a D.C. erased area of the disc, a second head 26 for writing data on the disc and a third head 28 for reading the data which has been written by the head 26. Each of the heads 24–28 are incorporated in a head arm assembly similar to that shown in the above Applequist patent where the head arm assembly includes as illustrated in FIG. 5 a body member 30 connected by a flexible spring 32 to a clamp 34 mounted on a T-block 36 which forms a part of the carriage 16. The magnetic recording head 28 is attached to an air-bearing slider 38 which is in turn attached by a gimbal spring 40 to the body 30 of the head arm assembly. The body 30 has a cam ramp 42 which cooperates with a cam 44 on a cam tower 46 to retract or unload the head 28 from the solid line position of FIG. 5 to the phantom line position of FIG. 5 when the carriage 16 is withdrawn by the voice coil motor 22 in a direction to the right as illustrated in FIG. 2. It will be apparent that the head arm assemblies for heads 24–28 may take the form of the head arm assemblies shown in the Applequist patent.

Figure 6:
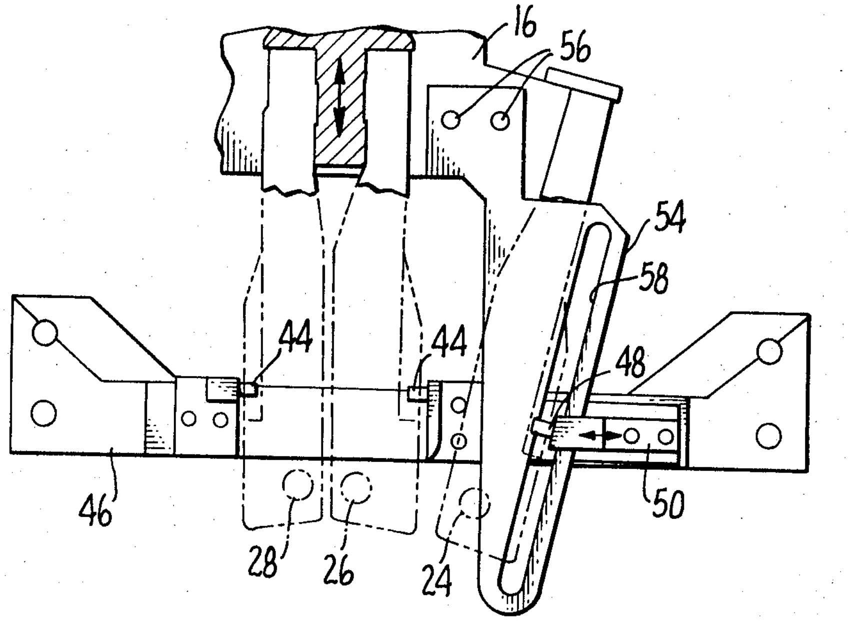
FIG. 6 is a top plan view partially in phantom of a portion of the mechanism for loading the cam ramp loaded heads onto the discs.
Figure 7:
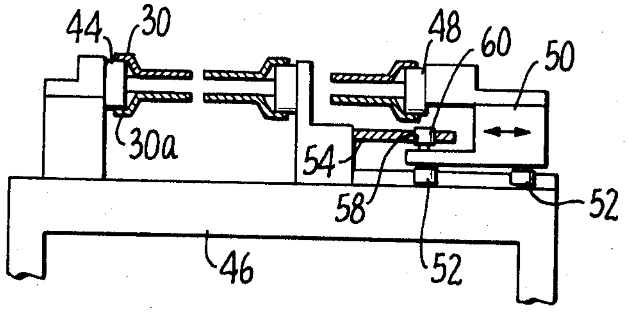
FIG. 7 is an end elevational view of the apparatus of FIG. 6.

With reference to FIG. 6 it will be noted that the head arm assembly which supports the head 24 is inclined at an angle to the way 18 and for this reason a modified mechanism is employed for moving the cam 48 by which the head 24 is loaded and unloaded onto the disc. Thus, a cart 50 (FIGS. 6 and 7) is mounted by a pair of rollers 52 for lateral movement on the cam tower 46, and the cam 48 for loading and unloading the head 24 is mounted on the cart 50. A blade 54 is attached to the carriage 16 by means of a pair of bolts 56 and the blade 54 includes an elongated slot 58 which is parallel to the length of the arm which supports the head 24. A roller 60 on the cart 50 is received in the slot 58 so that the cart is moved laterally to keep the cam 48 longitudinally aligned with the arms supporting head 24.

The accessing mechanism shown in the above identified Applequist and Wilson patent employed means for moving the head arm assemblies to different radial positions and rigidly locking the carriage when the head arm assemblies were located in those radial positions. This mechanism included a detector 120 in FIG. 7 of the Applequist, et al. patent which is illustrated at 62 in FIG. 1. The detector 62 may be incorporated in the certifier where it is desirable to electronically monitor the radial position of the heads for the purpose of recording the location of errors, but the detector may be eliminated where discs are to be certified on a pass-fail basis.

Contrary to the operation of the apparatus in the Applequist patent, the voice coil motor 22 in the certifier applies a light biasing force urging the carriage 16 to the left as indicated in FIG. 1, thereby tending to urge the heads 24–28 toward the axis of spindle 12. Such motion of the carriage and heads is limited by the engagement of a cam follower 64 with a cam 66. The cam 66 is mounted on a cam drive motor 68, and the cam follower 64 is mounted on an arm 70 which is attached to the carriage 16 as illustrated in FIG. 2. A conventional clamp 72 is provided for clamping a disc in test position.

A permanent magnet 74 is mounted under the disc 14 in a position to be moved radially along the disc in synchronization with the reading head 24 to D.C. erase the disc before it is read by the head 24. This movable magnet can be replaced by a long pipe magnet in the general location of the magnet 74, but extending from the outer diameter to the inner diameter of the disc, and the permanent magnet 74 can be replaced by a D.C. coil magnet mounted directly on the carriage 16. It is preferred, however, that the magnet be movable radially with the heads and that provision be made for reasons explained below for de-energizing or deactivating the D.C. erasing effect of the magnet.

The permanent magnet 74 is mounted on a carriage 76 by means of a pivot pin 78, and the carriage 76 is mounted on a pair of guide rods 80 which are mounted on a pair of brackets 82 and 84. A pair of sprockets 86 and 88 are mounted on the bracket 84 and frame 10, respectively (FIG. 3) and a roller chain 90 extends over the sprockets 86 and 88 with its opposite ends anchored on carriage 16. A stop 92 is attached to the chain 90 and a rotary catch 94 is attached to the carriage 76 and carries an ear 96 engageable with element 92 so that the permanent magnet 74 is pulled radially inwardly of the disc from its opposite side and in alignment with head 24 as head 24 is moved radially inward by voice coil motor 22. The stop 94 may be rotated 90° clockwise as illustrated in FIG. 3 for leaving the permanent magnet 74 in a retracted position to permit data to be recorded on the disc and read by head 24 during initial setup operations when it is desirable to align head 24 radially with the heads 26 and 28. A retraction spring 98 is mounted on bracket 84 and connected to the carriage 76 by a pin 100 to retract the magnet 74 when rapid retraction of the voice coil motor 22 withdraws the element 92 away from the latch finger 96.

It will be noted that the recording heads 24, 26 and 28 are spaced fairly closely together and because of this it may be necessary with some types of recording heads to provide shielding around the heads so that they are magnetically isolated from each other. This is particularly the case with the reading head 28 and the writing head 26, and where cross-talk between the heads is encountered, the cross-talk can often be eliminated by mounting small ferrite rings on top of the heads.

Figure 8:
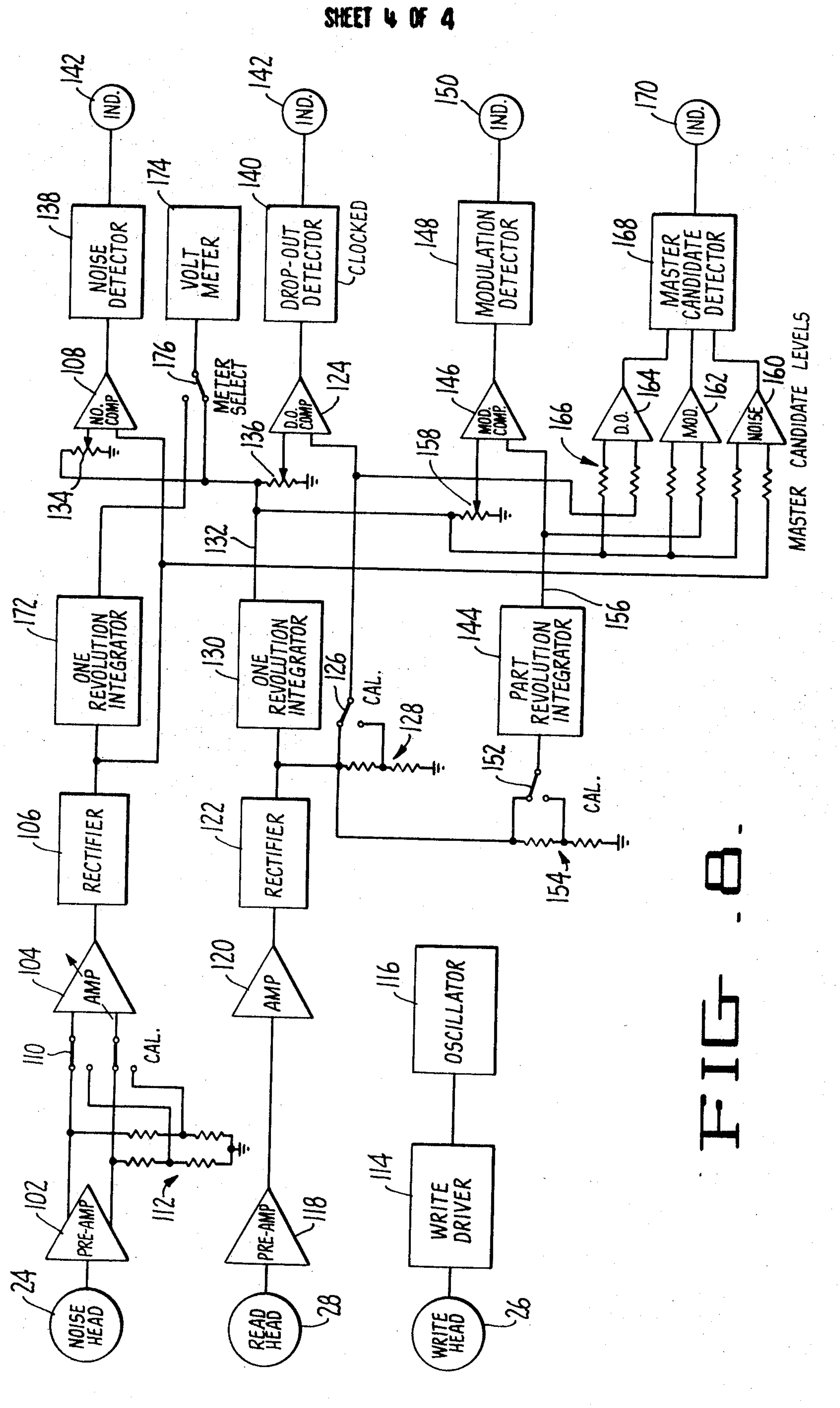
FIG. 8 is a schematic circuit diagram of the control circuits employed with the recording heads on the top side of the disc, a similar control circuit being employed for the recording heads on the bottom side of the disc.

With reference to FIG. 8, the noise reading head 24 is connected through a preamplifier 102, a variable amplifier 104 and rectifier 106 to a comparator 108, a double throw calibration switch 110 is provided for connection to the 25 percent down point on a voltage divider 112 for calibration as indicated hereinafter. The data writing head 26 is connected to a conventional write driver 114 and oscillator 116. Data read head 28 is connected to a preamplifier 118, amplifier 120 and rectifier 122 to a drop-out comparator 124, and a calibration switch 126 is provided for alternatively connecting the comparator 124 to the 40 percent down point on a voltage divider 128. The comparison standard for comparators 108 and 124 is provided by a one revolution integrator 130 which is connected to the rectified output of data read head 28 to generate a comparison signal on line 132 which is proportional to the root means square average output of the data read head 28 over the preceding revolution of the disc. The comparison signal is connected as indicated through potentiometers 134 and 136 to the comparators 108 and 124 which provide outputs to the detectors 138 and 140, respectively. These detectors operate to turn on indicator lights 142 when the input signals from rectifiers 106 and 122 drop below the comparison standards from the potentiometers.

The output of rectifier 122 is also connected through part revolution integrator 144 to modulation comparator 146, modulation detector 148 and indicator light 150 and the input to integrator 144 may be switched by calibration switch 152 to the 30 percent down point on voltage divider 154. Part revolution integrator 144 provides an output signal on line 156 which is a parameter of the root means square average output of rectifier 122 for a short period of time which is substantially less than one revolution of the disc but sufficiently higher than the data repetition rate of write head 26 that the output of integrator 144 follows the envelope of the data. Comparator 146 compares the part revolution integration to the standard comparison signal 132 through potentiometer 158 to indicate excessive modulation as indicated above. The input to the noise comparator 108, drop-out comparator 124 and modulation comparator 156 are also provided to master candidate comparators 160, 162 and 164, respectively, through fixed resistors 166 instead of the potentiometers 134, etc. A single master candidate detector 168 detects excessive levels from any of the comparators 160–164 to indicate on indicator light 170 that a test disc satisfies the special criteria of a master candidate. The fixed resistors 166 set calibration levels on the comparators 160–164 much more stringent than the 25 percent, 40 percent, 30 percent levels for ordinary discs.

A one revolution integrator 172 is connected to a digital volt meter 174 through a selector switch 176 which is used for head alignment when recording heads are initially installed on the certifier. Thus, when the heads 24, 26 and 28 are first installed on the certifier, the carriage is moved to a fixed position over the disc and locked with the D.C. erase magnet retracted and a circular data track is written with head 26. The radial position of head 28 is then adjusted by mechanical adjustment of the mounting of the head 28 on the T-block 36 until a maximum output reading is measured on the volt meter 714. The switch 176 is then changed and the position of head 24 is adjusted until a maximum reading is read on the volt meter.

The drop-out comparator 124 is then calibrated by moving switch 126 to the 40 percent down point and adjusting potentiometer 136 until the exact point where light 142 responds. Noise comparator 108 is calibrated with switch 110 down by adjusting variable amplifier 104 until just the point that indicator light 142 responds with gross adjustments made through potentiometer 134. Finally, comparator 146 is calibrated with switch 152 down by adjusting potentiometer 158 until indicator light 150 responds.

It will be apparent that more recording heads may be employed for performing additional functions and the multiple heads can be built into a single slider.

While one specific embodiment of the invention has been illustrated and described in detail herein, it is obvious that many modifications thereof may be made without departing from the spirit and scope of the invention.

We claim:

1. A disc certifier comprising:

a spindle for supporting a magnetic recording disc and rotating the disc about a central axis, a carriage mounted adjacent to the spindle for movement generally radially of said axis, three magnetic recording heads mounted on said carriage adjacent to each other and adapted to be positioned over the same recording surface of the disc with the heads mounted on the carriage in fixed position with respect to each other at substantially equal radii from said axis, drive means for moving said carriage continuously radially of the axis while a disc is rotating on the spindle to move the recording heads along a continuous spiral path over the disc, and control means connected to said recording heads for writing data with one head and reading with the other heads.

2. The apparatus of claim 1 characterized further by the inclusion of D.C. erase means mounted adjacent to the path of discs on the spindle for D.C. erasing the recording layer on the disc before the recording layer reaches the three heads whereby the first head reading the erased disc detects extra bits and the second head reading the disc detects missing bits.

3. The apparatus of claim 1 in which:

said recording heads are flying heads adapted to be supported over the disc on an air-bearing layer generated by rotation of the disc, and said drive means comprises a cam for limiting the radially inward movement of the carriage, a cam follower mounted on the carriage and engaging the cam means for moving the cam with respect to the axis of the spindle to permit the carriage to approach the axis, and a voice coil motor connected to the carriage for urging the carriage toward the axis thereby keeping the cam follower on the cam with the voice coil motor adapted to pull the carriage away from the axis separating the cam follower from the cam.

4. The apparatus of claim 2 in which said control means comprises:

an integrator connected to the second reading head for generating a comparison signal which is a parameter of the average signal output of the second head over a substantial length of said spiral path, a drop-out comparator connected to the integrator and the second reading head for comparing the instantaneous output of the second head to the comparison signal, and a noise comparator connected to the integrator and the first reading head for comparing the instantaneous output of the first reading head to the comparison signal.

* * * * *